United States Patent
Santa Cruz et al.

[11] Patent Number: 6,139,038
[45] Date of Patent: Oct. 31, 2000

[54] WELDLESS BICYCLE FRAME

[76] Inventors: Cathy D. Santa Cruz, 401 Canyon Way, #43; Donald N. Minoli, 426 Gomez Ct., both of Sparks, Nev. 89434

[21] Appl. No.: 09/130,840

[22] Filed: Aug. 7, 1998

[51] Int. Cl.[7] .................................................. B62K 1/00
[52] U.S. Cl. ........................ 280/278; 280/274; 280/287; 280/281.1
[58] Field of Search .................................. 280/274, 278, 280/281.1, 287, 288.3; 297/195.1

[56] References Cited

U.S. PATENT DOCUMENTS

| | | | |
|---|---|---|---|
| 583,256 | 5/1897 | Gilbert | 280/274 |
| 1,287,979 | 12/1918 | Harley | 280/281.1 |
| 2,080,972 | 5/1937 | Seehase | 280/278 |
| 2,244,709 | 6/1941 | Kinzel | 280/281.1 |
| 2,855,219 | 10/1958 | Douglas et al. | 280/281.1 |
| 4,500,103 | 2/1985 | Klein | 280/281.1 |
| 4,585,247 | 4/1986 | Takada | 280/281.1 |
| 5,211,415 | 5/1993 | Gasiorowski | 280/288.3 |
| 5,215,322 | 6/1993 | Enders | 280/281.1 |
| 5,620,196 | 4/1997 | Bekik | 280/281.1 |
| 5,794,958 | 8/1998 | Hsiao | 280/278 |

FOREIGN PATENT DOCUMENTS

| | | | |
|---|---|---|---|
| 1069997 | 7/1954 | France | 280/281.1 |
| 403111 | 9/1924 | Germany | 280/281.1 |
| 407968 | 1/1925 | Germany | 280/281.1 |
| 421799 | 5/1948 | Italy | 280/281.1 |
| 132076 | 6/1951 | Sweden | 280/281.1 |
| 227487 | 10/1943 | Switzerland | 280/274 |
| 383361 | 11/1932 | United Kingdom | 280/231 |

*Primary Examiner*—Daniel G. DePumpo

[57] ABSTRACT

A bicycle frame is hereby provided which allows component assembly at the point of manufacture by a method other than welding. The present invention is a novel frame design which includes multiple aluminum extrusions, with each of those extrusions being machined and anodized prior to assembly. Further taught is a unique A-X frame configuration and simplified construction.

2 Claims, 8 Drawing Sheets

WELDLESS BICYCLE FRAME

FIELD OF THE INVENTION

This invention relates to mass market bicycle frames but more particularly relates to a bicycle frame which does not use any welding in its construction.

BACKGROUND OF THE INVENTION

As of the mid-1990's, the vast majority of bicycles available in today's market have a welded steel or aluminum frame. There are a few bicycles with frames being made from exotic materials, such as composite or carbon fiber, however none of these are mass produced. All prior art bicycle frames fabricated of steel or aluminum must be jigged and welded into the desired form. Furthermore, unlike the present invention, after fabrication most of these welded frames must be heat treated, stress relieved, and/or re-straightened. Presently there are no bicycle frames known to the applicants that are fabricated from interlocking members. Additionally, the prior art frame design of choice has been the "diamond frame" as best exemplified within U.S. Pat. No. 4,500,103 issued to Klein.

SUMMARY OF THE INVENTION

It is therefore a primary object of the present invention to provide a bicycle frame which uses no welding in its fabrication.

Another important object is to provide a unique method of manufacture for the present invention.

Also another object is to provide a unique method of assembly for the present invention.

Yet another object is to provide a bicycle of light weight construction that is competitive with today's market.

Another object of the present invention is to provide an A-X configured frame that when assembled and when viewed from above forms substantially an A-shape, and when viewed either side forms substantially an X-shape.

Still another important object is to provide a bicycle frame utilizing extruded aluminum frame components including four rail members, a head tube, a right side rear axle attachment plate, a left side rear axle attachment plate, a hollow cross member, a hollow seat post member, and a seat support member.

Still a further object of the present invention is to provide a frame which is of optimal integrity and torsional stability.

Still a further object of the present invention is to provide a frame which is of simple construction, easy to manufacture and assemble due to CNC machining, and which is economically viable in today's market.

Yet another object of the present invention is to provide a bicycle frame which is fabricated from 6061-T6 alloy and temper aluminum, or any other future suitable material of choice.

DETAILED DESCRIPTION OF THE DRAWINGS

Referring now in detail to the drawings wherein like characters refer to like elements throughout the various views. Within FIG. 1, arrow (10) represents an overview of the present invention showing an assembled weldless bicycle frame. It is to be noted bicycle (arrow 10) when assembled and viewed from above forms substantially an A-shape and when assembled and viewed from either side, forms substantially an X-shape.

Figure 1:
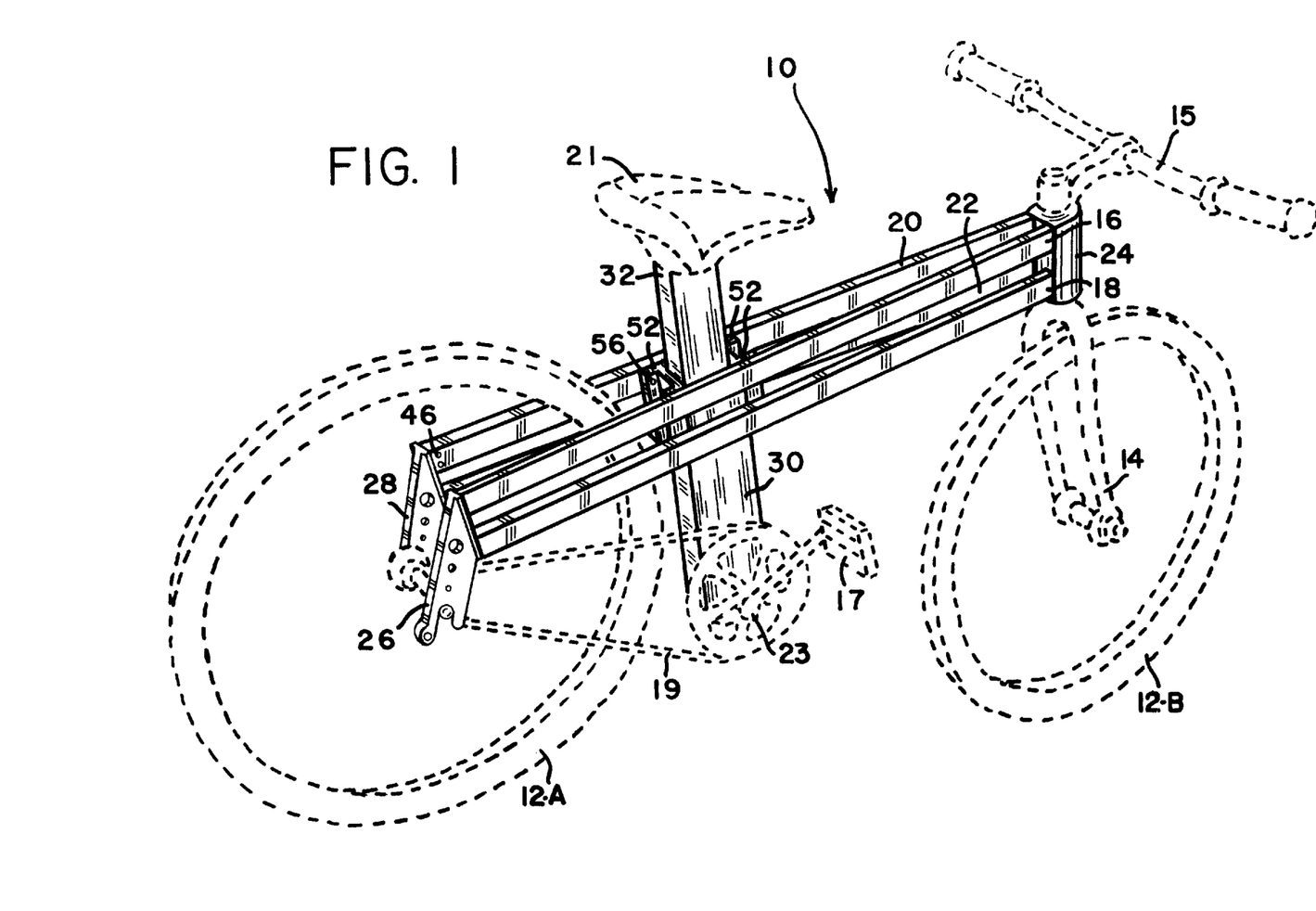
FIG. 1 is substantially a perspective view of the present invention showing a bicycle frame utilizing extruded aluminum frame components.

It is to be understood that bicycle (arrow 10) is supported in the usual manner by a pair of conventional prior art bicycle wheels (12-A) & (12-B). However, prior art spokes are not shown for purposes of clarity. Bicycle (arrow 10) also substantially includes a prior art front fork (14), attached handle bars (15), a pedal mechanism (17), a crank shaft (23), a drive chain (19) and a seat (21).

Figure 6:
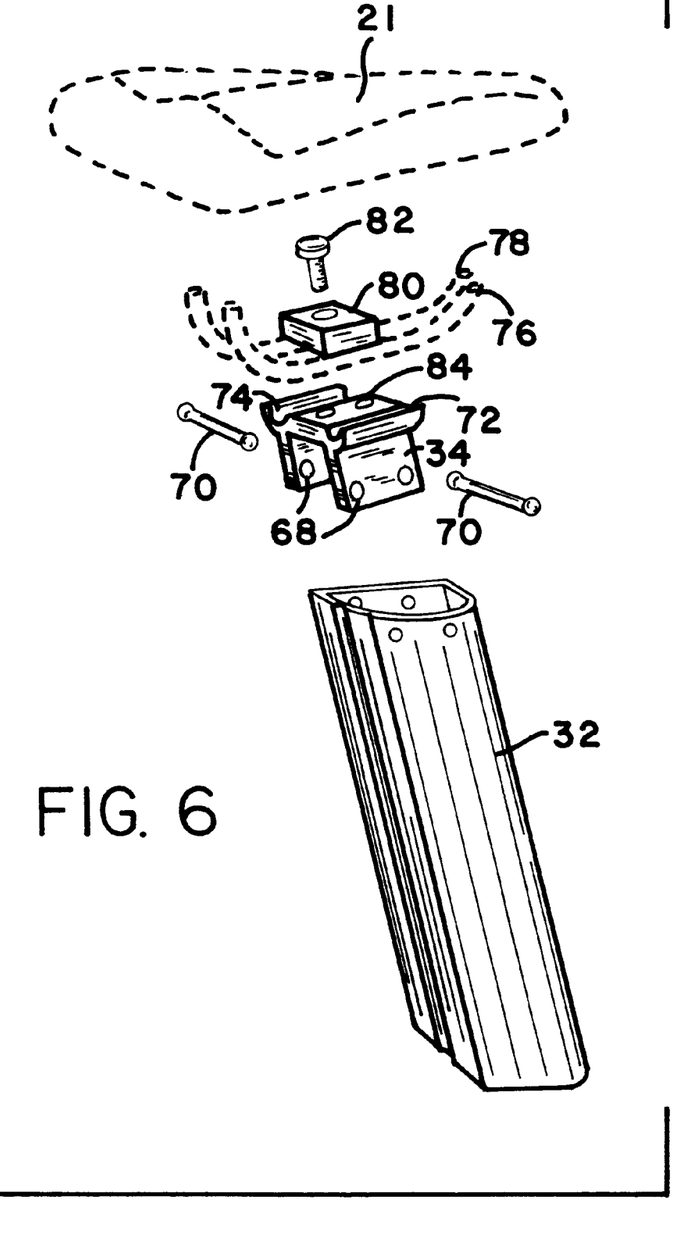
FIG. 6 is substantially a perspective plan view for attaching a seat to the seat post member.

Bicycle frame (arrow 10) substantially comprising of the following: a hollow upper right side rail member (16), a hollow lower right side rail member (18), a hollow upper left side rail member (20), a hollow lower left side rail member (22), a head tube (24), a right side rear axle attachment plate (26), a left side rear axle attachment plate (28), a cross member (30), a hollow seat post member (32) and a seat support member (34), the last named only shown in FIG. 6.

Referring now to each of the rail members (16,18,20 and 22) which may be fabricated from substantially any suitable material of engineering choice, such as metal, or the like. However, in the preferred embodiment, each of the members are formed by heating and pressing billet aluminum through a first die which forms the shape for each of the hollow rail members, and each rail member (16,18,20 and 22) having a head end and a rear end. Furthermore, each rail member may be of any suitable shape or size of engineering choice, such as 3' long by ½" wide by 2" deep, or the like.

Referring now to head tube (24) which can be fabricated from substantially any suitable material of engineering choice, such as metal or the like. Or as the applicants prefer, head tube (24) can be fabricated by heating and pressing billet aluminum through a second die which forms the shape for the head tube (24). Again, head tube (24) can be of any suitable shape or size of engineering choice, such as 4" long by 1¾" wide by 2" deep, or the like.

Figure 2:
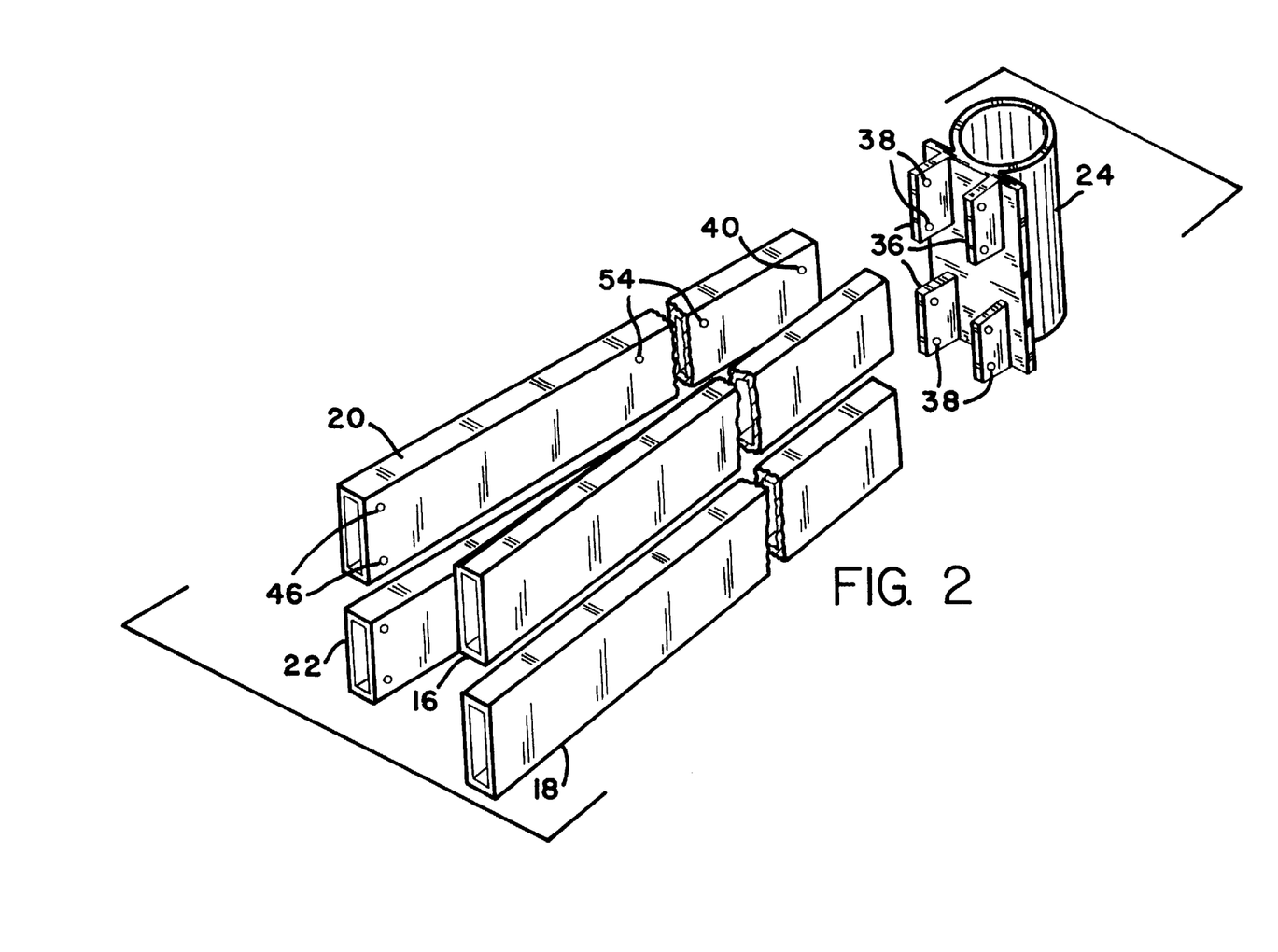
FIG. 2 is substantially an exploded, partial perspective plan view, showing four rail members and a head tube in accordance with the present invention.

Head tube (24) having attachment means thereon for fixedly attaching each head end of each rail member (16, 18,20 and 22) to head tube (24). It is to be noted that any suitable attachment means of engineering choice may be used, however the preferred embodiment as exemplified within FIG. 2, includes the following attachment means. Head tube (24) having multiple protrusions (36) thereon, each being of a shape and size to be slidably engaged within the head end of each rail member (16,18,20 and 22). With each protrusion (36) being fixedly secured in place by at least one fastener. It is to be noted that any suitable fastener of engineering choice may be used. For example, a screw (not shown) which is inserted into at least one bore (38) located on each protrusion (36), and into a second bore (40), (only one shown in FIG. 2) thus fixedly attaching each rail member (16,18,20 and 22) to head tube (24) in a secure manner.

Figure 3:
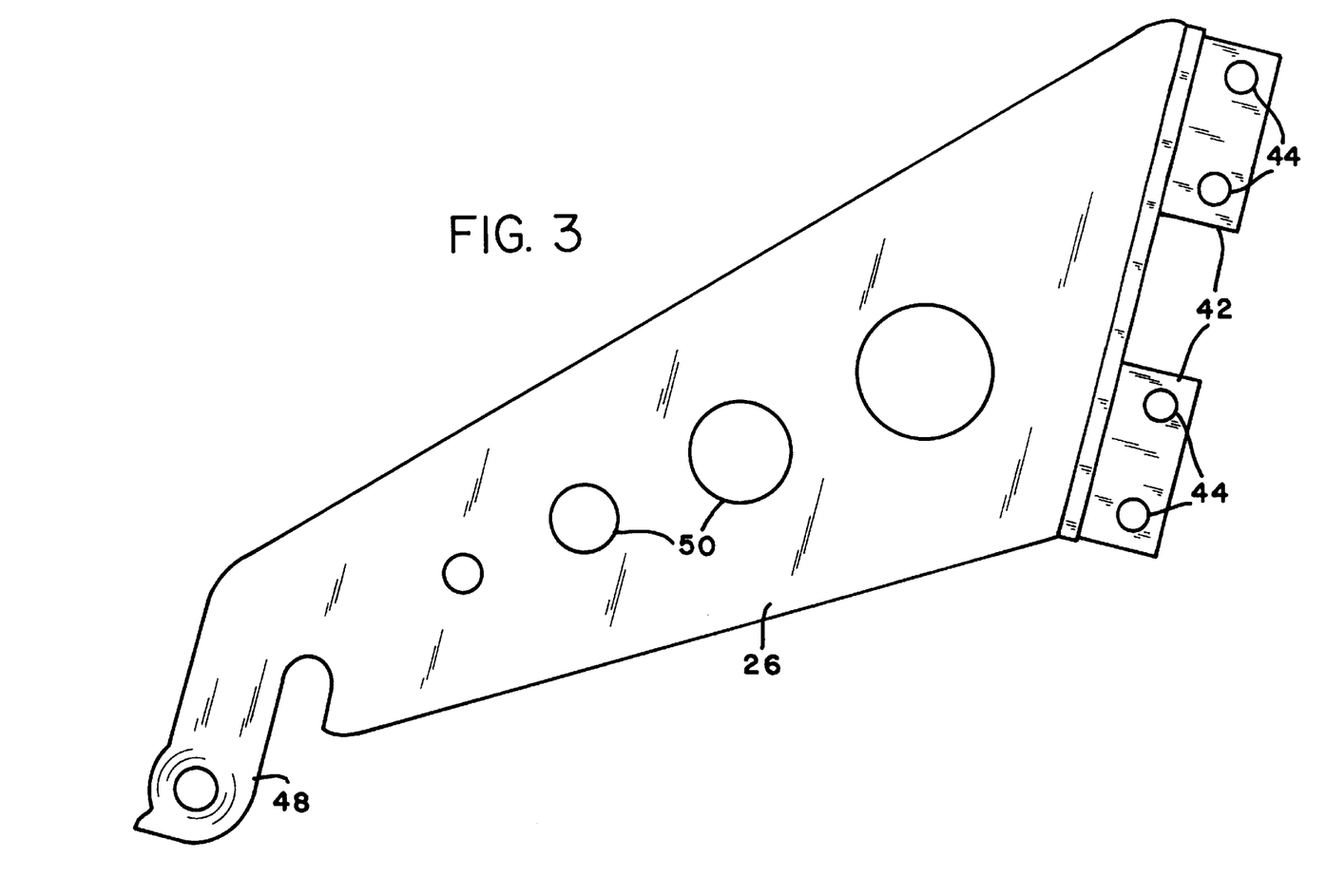
FIG. 3 is substantially a side view of a right side rear axle attachment plate.
Figure 4:
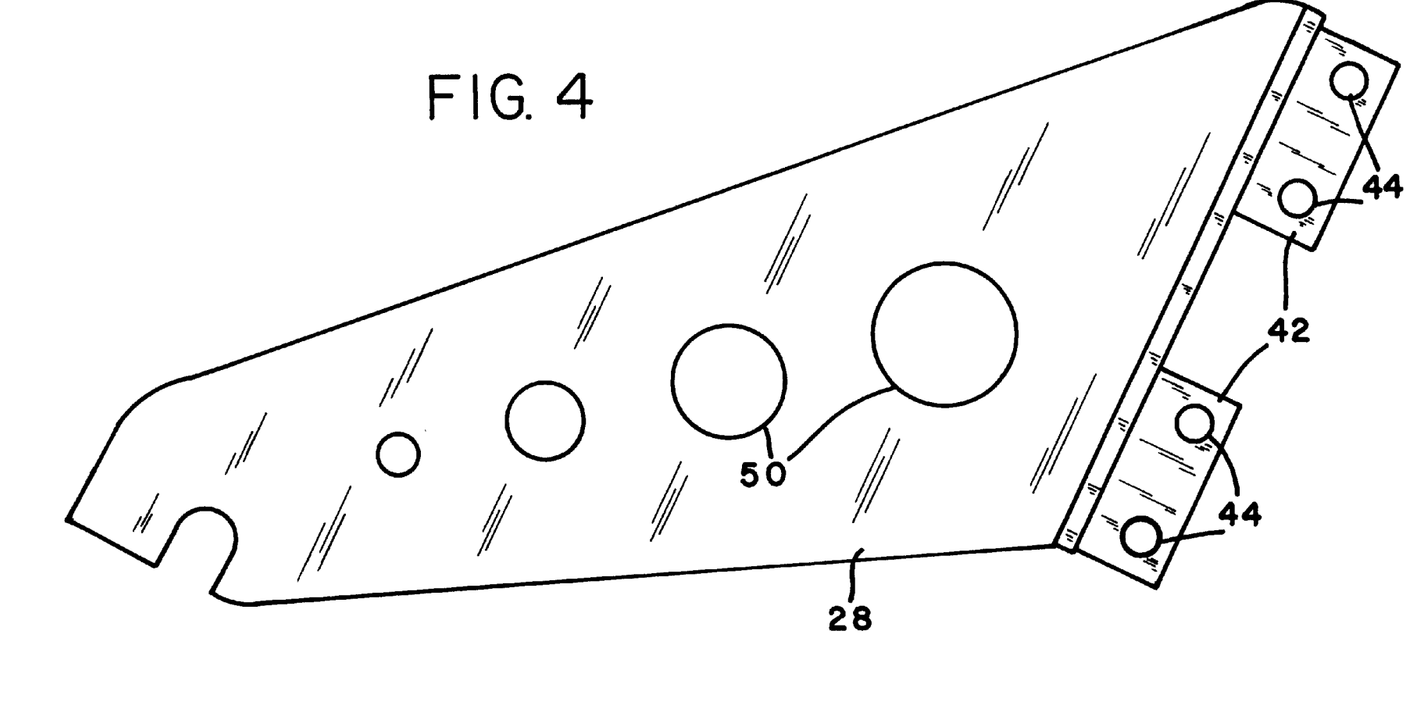
FIG. 4 is substantially a side view of a left side rear axle attachment plate.

Referring now to FIGS. 1, 3 & 4, wherein we show a right side rear axle attachment plate (26) and a left side rear axle attachment plate (28), each of which may be fabricated from substantially any suitable material of engineering choice, such as metal or the like. However, the preferred embodiment includes each attachment plate (26 & 28) being fabricated by heating and pressing billet aluminum through a third die which forms the shape for right side rear axle attachment plate (26) and the shape for left side rear axle attachment (28).

Right side rear axle attachment plate (26) having attachment means thereon for fixedly attaching each rear end of each right side rail member (16 & 18) to right side rear axle attachment plate (26). It is to be noted that any suitable attachment means of engineering choice may be used. Such as in the preferred embodiment we show, a right side rear axle attachment plate (26) having multiple protrusions (42) thereon, each being of a shape and size to be slidably engaged within each rear end of each right side rail member (16 & 18). It is to be noted any suitable fastener of engineering choice may be used to fixedly attach right side rear axle attachment plate (26) in a secure manner. For example, protrusions (42) include at least one bore (44) there through which is of a shape and size to accept at least one fastener (not shown) there through, and each right side rail member (16 & 18) include at least one bore (46) there through which receives the noted fastener. Thus, fixedly attaching each right side rail member (16 & 18) to right axle attachment plate (26) in a secure manner.

It is to be noted right side rear axle attachment plate (26) may also include a derailleur hanger (48) thereon for use if the bicycle is to be a 21 speed, or the like. It is to be further noted that each axle attachment plate (26 & 28) may also include bores (50) there through, which reduce the overall weight of each attachment plate (26 & 28).

Left side rear axle attachment plate (28) having attachment means thereon for fixedly attaching each rear end of each left side rail member (20 & 22) to left side rear axle attachment plate (28). It is to be noted that any suitable attachment means of engineering choice may be used. Such as in the preferred embodiment we show, a left side rear axle attachment plate (28) having multiple protrusions (44) thereon, each being of a shape and size to be slidably engaged within each rear end of each left side rail member (20 & 22). It is to be noted any suitable fastener of engineering choice may be used to fixedly attach left side rear axle attachment plate (28) in a secure manner. For example, protrusions (42) include at least one bore (44) there through which is of a shape and size to accept at least one fastener (not shown) there through, and each left side rail member (20 & 22) include at least one bore (46) there through which receives the noted fastener. Thus, fixedly attaching each left side rail member (20 & 22) to left rear axle attachment plate (28) in a secure manner.

It is to be understood each attachment plate (26 & 28) can be fabricated into substantially any suitable shape or size of engineering choice, such as 9" long by 3/16 wide by 4" deep, or the like.

Figure 5:
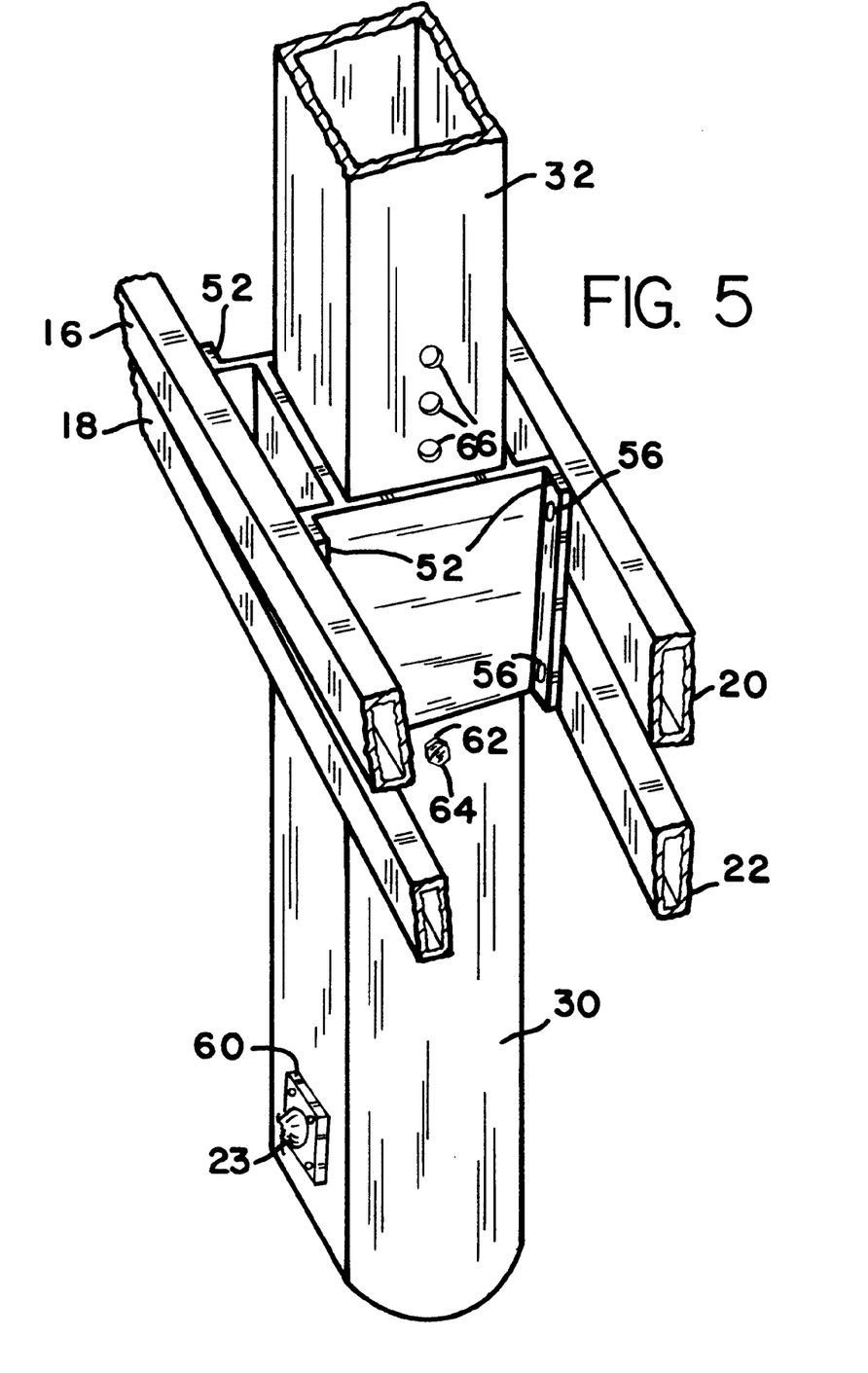
FIG. 5 is substantially a partial perspective view showing rail members, a cross member, and seat post member.
Figure 7:
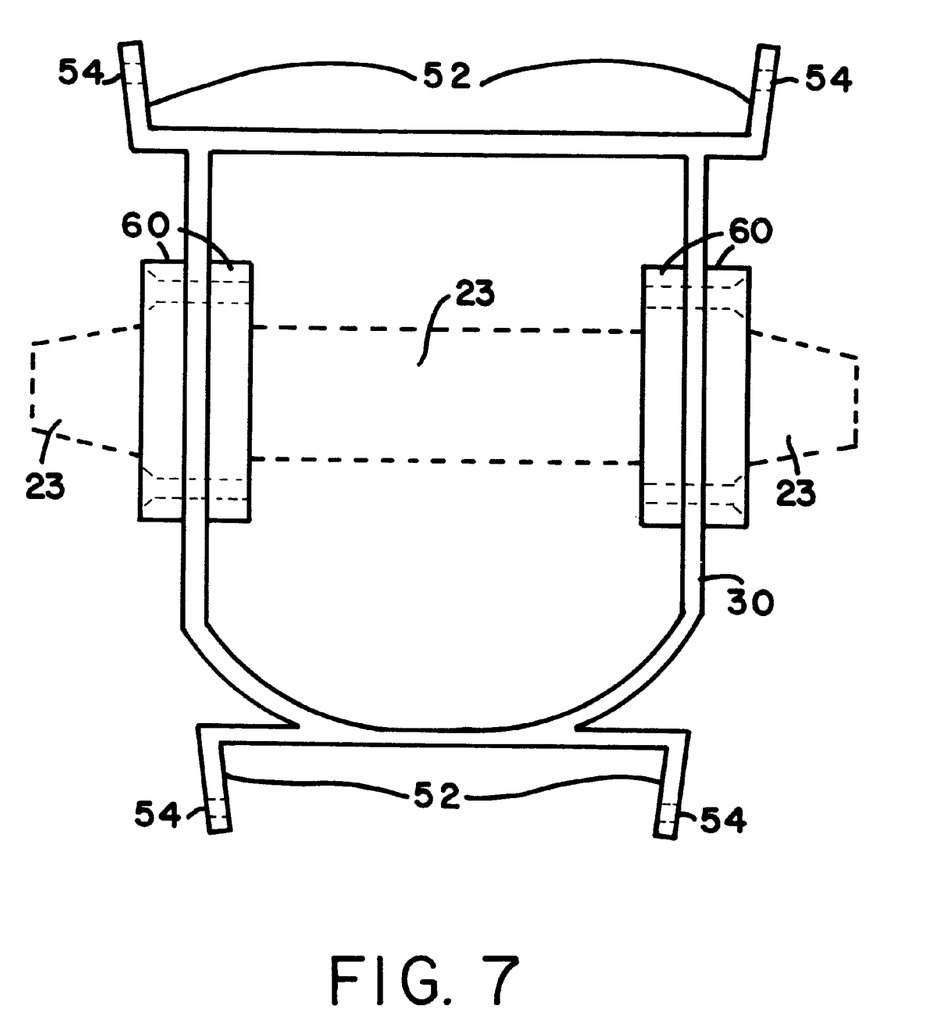
FIG. 7 is substantially a bottom end view of the cross member.

Referring now to cross member (30) as seen within FIGS. 1, 5, and 7, which can be fabricated from substantially any suitable material of engineering choice, such as metal or the like, and can be of any suitable shape or size of engineering choice, such as 14½" long by 2" wide by 3" deep, or the like. However, in the preferred embodiment cross member (30) is fabricated by heating and pressing billet aluminum through a fourth die which forms the shape for cross member (30).

Cross member (30) having an upper end and a lower end and includes attachment means thereon for fixedly attaching cross member (30) between each right side rail member (16 & 18) and each left side rail member (20 & 22). It is to be noted any suitable attachment means of engineering choice may be used. For example in the preferred embodiment, cross member (30) having multiple external flanges (52) thereon, and flanges (52) each being fixedly attached to one of each rail member (16, 18, 20, or 22), and flanges (52) each being secured in place onto one of each rail member (16, 18, 20, or 22) with at least one fastener. It is to be noted any suitable fastener of engineering choice may be used. For example, each rail member (16, 18, 20, or 22) may include at least one bore (54) there through which is of a shape and size to receive a screw (56) therein, such as seen within FIGS. 1 and 5.

Cross member (30) further includes support means thereon for supporting prior art pedal mechanism (17) and attached crank shaft (23) there through. It is to be understood that any suitable support means of engineering choice may be used. For example in the preferred embodiment, as represented in FIG. 7, cross member (30) includes two opposed aligned bores there through which are of a shape and size to receive crank shaft (23) there through, with crank shaft (23) being rotationally supported by multiple prior art bearings (not shown) which are enclosed within housings (60).

Referring now to hollow seat post support member (32) which can be fabricated from substantially any suitable material of engineering choice, such as metal or the like, and which can be of any suitable shape or size of engineering choice, such as 15" long by slightly less than 2" wide by slightly less than 3" deep, or the like. However, in the preferred embodiment seat post member (32) is fabricated by heating and pressing billet aluminum through a fifth die which forms the shape for hollow seat post member (32).

Hollow seat post member (32) having an upper end and a lower end, with the lower end being telescopically slidably adjustably engaged within the upper end of cross member (30).

Cross member (30), as seen in FIG. 5, having attachment means thereon for adjustably fixedly attaching the lower end of hollow seat post member (32) to cross member (30). It is to be noted any suitable attachment means of engineering choice may be used. For example, cross member (30) having at least one threaded bore (62) there through which is of a shape and size to threadably receive a fastener (64) there through, and hollow seat post member (32) having at least two seat height adjustment bores (66) there through which are of a shape and size to receive fastener (64) therein, and bore (62) being aligned with at least one seat height adjustment bores (66) and secured in place by fastener (64). It is to be noted any suitable fastener of engineering choice may be used, such as a threaded bolt, or the like.

Referring now to seat support member (34) which can be fabricated from substantially any suitable material of engineering choice, such as metal or the like, and which can be substantially of any suitable shape and size of engineering choice. Such as 2½" wide by 2" high by slightly less than 3" deep, or the like. However, in the preferred embodiment seat support member (34) is fabricated by heating and pressing billet aluminum through a sixth die which forms the shape for seat support member (34).

Seat support member (34) having attachment means thereon for fixedly attaching upper end of hollow seat post member (32) to seat support member (34). It is to be noted substantially any suitable attachment means of engineering choice may be used. For example, seat support member being of a shape and size to be slidably engaged within upper end of hollow seat post member (32) and seat support member (34) being fixedly attached to upper end of hollow seat post member by multiple bores (68) and multiple fasteners (70), or the like. Seat support member (34) further having a right side spring support channel (72) and a left side spring support channel (74).

Seat support member (34) further having a seat support assembly for attaching prior art seat (21) to seat support member (34). It is to be noted any suitable assembly of engineering choice may be used. For example, the assembly may be comprised of the following: Prior art seat (21) having a right side seat spring (76) and left side seat spring (78), and the assembly further includes a seat retaining block (80). Right side seat spring being slidably positioned with right side spring support channel (72) and left side seat spring (78) being slidably positioned within left side spring support channel (74) and seat retaining block (80) interconnecting seat (21), springs (76 & 78) and seat support member (34) by at least one fastener (82). It is to be noted substantially any suitable fastener of engineering choice may be used. Furthermore, seat support member (34) includes at least a first and a second bore (84) therein which are of a shape and size to receive the noted fastener (82). Whereby, seat support member (34), the noted assembly, and hollow seat post member (32) in combination allow seat (21) to be adjustably positioned between a forward position and a rearward position.

In addition to being able to vary the position of the seat (21) relative to the seat post (32), the height of the seat (21) relative to the peddles (17) can be adjusted to accommodate riders of different physical sizes.

Figure 8:
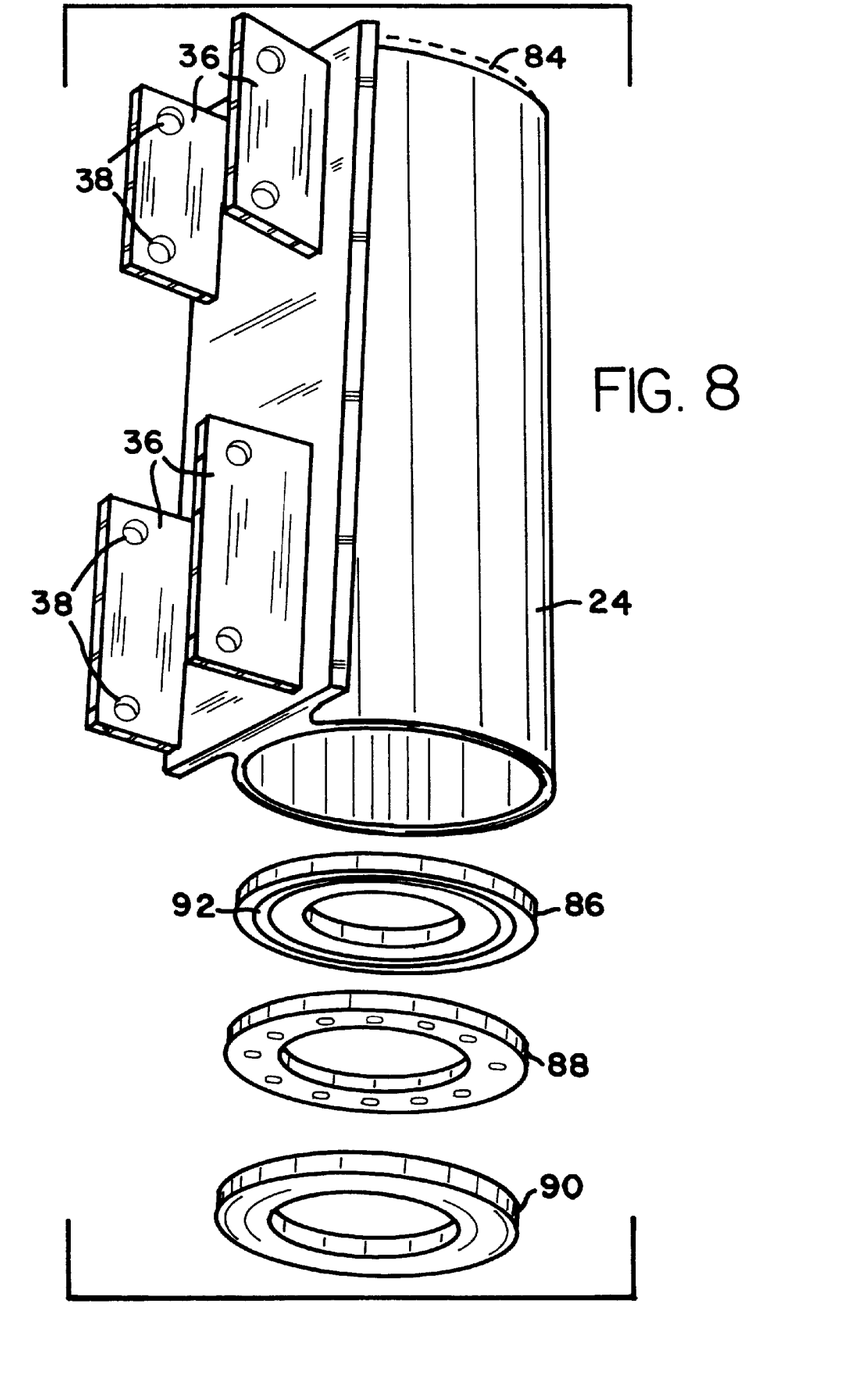
FIG. 8 is substantially a perspective plan view of the head tube and its internal components.

Referring to head tube (24) as shown within FIG. 8, further includes a prior art sealed ball bearing (84), a top race (86), a thrust bearing (88) and a bottom race (90). It is to be noted top race (86) and bottom race (90) each include a circular recess (92) therein which allow thrust bearing (88) to freely rotate within circular recess (92). Thus steer tube (not shown) which is an integral part of front fork (14) functions in the usual manner.

It will also be noted that bicycle frame (arrow 10) includes each rail member (16,18,20, & 22), each attachment plate (26 & 28), cross member (30) head tube (24), seat post member (30) and seat support member (34) each fabricated from extruded aluminum and each are anodized.

It is to be understood that certain measurements may change as a result of a variety of factors not relating to the general principals of the present invention, including changes required by metallurgical and extrusion processing considerations. Therefore, references to all dimensions are only exemplary and all dimensions in actual construction are of engineering choice.

The present application discloses the general theory regarding the A-X frame bicycle, and it is to be understood and appreciated that the A-X frame will evolve in design as such theories are applied to future bicycle frame technology. It is contemplated within the scope of the present invention that the A-X frame can be adapted to and utilized with the construction of mountain bikes, BMX bikes, and road bikes, or as such further frame applications evolve or are adopted by 1998 and beyond bicycling public. The height, width, length, and wall thickness featured by various extrusions referenced herein shall be determined through and by further research and developments efforts, engineering, application, and extrusion industries tolerances.

It is contemplated by the present invention that the initial bicycle frame (arrow 10) utilizing the A-X weldless frame is to be produced and marketed on the basis of the unisex style, on the premise of "one size fits all". It is further contemplated that the frame will be available in any color of choice.

The invention has been disclosed in terms of a preferred embodiment thereof, which provides a bicycle frame assembly that is of great novelty and utility. Various changes, modifications, and alterations in the teachings of the present invention may be contemplated by those skilled in the art without departing from the intended spirit and the scope thereof. It is intended that the present invention encompass such changes and modifications.

It is to be further understood that we herein provide a method of manufacturing finished component parts for weldless bicycle frame (arrow 10) comprising of the following steps:

a. heating and pressing billet aluminum through a first die which forms the shape for an upper right side hollow rail member (16), the shape for a lower right side hollow rail member (18), the shape for an upper left side hollow rail member (20) and the shape for a lower left side rail member (22);

b. heating and pressing billet aluminum through a second die which forms the shape for a head tube (24);

c. heating and pressing billet aluminum through a third die which forms the shape for a right side rear axle attachment plate (26), and the shape for a left side rear axle attachment plate (28);

d. heating and pressing billet aluminum through a fourth die which forms the shape for a cross member (30);

e. heating and pressing billet aluminum through a fifth die which forms the shape for a hollow seat post member (32);

f. heating and pressing billet aluminum through a sixth die which forms the shape for a seat support member (34);

g. cutting each hollow rail member (16,18,20,& 22) to a pre-determined length;

h. cutting head tube (24) to a pre-determined length;

i. cutting each attachment plate (26 & 28) to a pre-determined length;

j. cutting cross member (30) to a pre-determined length;

k. cutting hollow seat post member (32) to a pre-determined length;

l. cutting seat support member (34) to a pre-determined length;

m. machining each hollow rail member (16, 18, 20 & 22) into pre-determined precision dimensions;

n. machining head tube (24) into pre-determined precision dimensions;

o. machining each attachment plate (26 & 28) into pre-determined precision dimensions;

p. machining cross member (30) into pre-determined precision dimensions;

q. machining hollow seat post member (32) into pre-determined dimensions;

r. machining seat support member (34) into pre-determined precision dimensions;

s. anodizing each rail member (16, 18, 20 & 22);
t. anodizing head tube (24);
u. anodizing each attachment plate (26 & 28);
v. anodizing cross member (30);
w. anodizing hollow seat post member (32) and;
x. anodizing seat support member (34).

It is to be further noted we herein provide a method for assembling finished component parts to form a weldless bicycle frame comprising of the following steps:

a. aligning the head end of a hollow upper right side rail member (16) with a first protrusion (36) on a head tube (24);
b. sliding head end of hollow upper right side rail member (16) onto first protrusion (36);
c. attaching head end of hollow upper right side rail member (16) onto first protrusion (36) with at least one fastener;
d. aligning the head end of a hollow lower right side rail member (18) with a second protrusion (36) on head tube (24);
e. sliding head end of hollow lower right side rail member (18) onto second protrusion (36);
f. attaching head end of hollow lower right side rail member (18) onto second protrusion (36) with at least one fastener;
g. aligning the head end of a hollow upper left side rail member (20) with a third protrusion (36) on head tube (24);
h. sliding head end of hollow upper left side rail member (20) onto third protrusion (36);
i. attaching head end of said hollow upper left side rail member (20) onto third protrusion (36) with at least one fastener;
j. aligning the head end of a hollow lower left side rail member (22) with a fourth protrusion (36) on head tube (24);
k. sliding head end of hollow lower left side rail member (22) onto fourth protrusion (36);
l. attaching head end of hollow lower left side rail member (22) onto fourth protrusion (36) with at least one fastener;
m. aligning the rear end of hollow upper right side rail member (18) with a first protrusion (42) on a right side rear axle attachment plate (26);
n. sliding rear end of hollow upper right side rail member (18) onto first protrusion (42) on right side rear axle attachment plate (26);
o. attaching rear end of hollow upper right side rail member (18) onto first protrusion (42) on right side rear axle attachment plate (26) with at least one fastener;
p. aligning the rear end of hollow lower right side rail member (18) with a second protrusion (42) on right side rear axle attachment plate (26);
q. sliding rear end of hollow lower right side rail member (18) onto second protrusion (42) on right side rear axle attachment plate (26);
r. attaching rear end of hollow lower right side rail member (18) onto second protrusion (42) on right side rear axle attachment plate (26) with at least one fastener;
s. aligning the rear end of hollow upper left side rail member (20) with a first protrusion (42) on a left side rear axle attachment plate (28);
t. sliding rear end of hollow upper left side rail member (20) onto first protrusion (42) on said left side rear axle attachment plate (28);
u. attaching rear end of hollow upper left side rail member (20) onto first protrusion (42) on left side rear axle attachment plate (28) with at least one fastener;
v. aligning the rear end of hollow lower left side rail member (22) with a second protrusion (42) on left side rear axle attachment plate (28);
w. sliding rear end of hollow lower left side rail member (20) onto second protrusion (42) on left side rear axle attachment plate (28);
x. attaching rear end of hollow lower left side rail member (22) onto (42) second protrusion on left side rear axle attachment plate (28) with at least one fastener;
y. positioning a cross member (30) between each right side rail member (16 & 18) and each left side rail member (20 & 22);
z. attaching cross member (30) to each rail member (16,18,20, & 22) with multiple fasteners (56);
aa. inserting a hollow seat post member (32) telescopically into the top end of cross member (30);
bb. adjusting hollow seat post member (32) into a position of choice;
cc. attaching hollow seat post member (32) to cross member (30) with at least one fastener;
dd. inserting a seat support member (34) into hollow seat post member (32);
ee. attaching seat support member (34) to seat post member (32) with at least one fastener; and;
ff. attaching a seat (21) to seat support member (34) using a seat support assembly.

Although the invention has been herein shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus's.

What we claim as new and wish to secure by Letters Patent is:

1. A weldless bicycle frame comprising: a hollow upper right side rail member; a hollow lower right side rail member; a hollow upper left side rail member; a hollow lower left side rail member; a head tube; a right side rear axle attachment plate; a left side rear axle attachment plate; a hollow cross member; a hollow seat post member; and a seat support member; said frame when assembled and viewed from above forms an A-shape, said frame when assembled and viewed from either side forms an X-shape, each said rail member having a head end and a rear end, said hollow seat post member having an upper end and a lower end, said cross member having an upper end and a lower end, said head tube having a top race; a thrust bearing; and a bottom race; said head tube having multiple protrusions thereon, said protrusions each being of a shape and size to be slidably engaged within said head end of each said rail member with said protrusions each being fixedly secured in place by at least one fastener, said right side rear axle attachment plate having multiple protrusions thereon, last said protrusions each being of a shape and size to be slidably engaged within each said rear end of each said right side rail member, last said protrusions each being fixedly secured in place with at least one fastener, said left side rear axle attachment plate having multiple protrusions thereon, last said protrusions each being of a shape and size to be slidably engaged within each said rear end of each said left side rail member, last said protrusions each being fixedly secured in place with at least one fastener, said cross member having multiple external flanges thereon, said flanges each being fixedly attached to one of each said rail member, said flanges each being secured in place onto one of each said rail member with at least one fastener, said lower end of said hollow seat post member being telescopically slidably adjustably engaged within said upper end of said cross member, said cross member having at least one threaded bore there through which is of a shape and size to threadably receive a fastener there through, said hollow seat post member having at least two seat height adjustment bores there through which are of a shape and size to receive said fastener therein, said bore being aligned with at least one of said seat height adjustment bores and fixedly secured in place by last said fastener, and said seat support member being of a shape and size to be slidably engaged within said upper end of said hollow seat post member, said seat support member having a right side spring support channel and a left side spring support channel, and said seat support member being fixedly attached to said upper end of said hollow seat post member by multiple bores and multiple fasteners.

2. The frame of claim 1 wherein said seat support member further includes a seat support assembly comprising: a seat having a right side seat spring and a left side seat spring; and a seat retaining block; said right side seat spring being slidably positioned within said right side spring support channel, said left side seat spring being slidably positioned within said left side spring support channel, said seat retaining block interconnecting each said spring and said seat support member by at least one fastener in an adjustable manner, whereby:
said seat support member, said assembly, and said hollow seat post member in combination allow said seat to be adjustably positioned between a forward position and a rearward position.

* * * * *